Aug. 21, 1951  J. J. FRENCH  2,565,072
STABILIZING JACK FOR TRUCK DOCKS
Filed May 12, 1949

INVENTOR.
Joseph J. French
BY
Murray, Sackhoff & Murray
ATT'YS

Patented Aug. 21, 1951

2,565,072

UNITED STATES PATENT OFFICE 2,565,072

STABILIZING JACK FOR TRUCK DOCKS

Joseph J. French, Cincinnati, Ohio

Application May 12, 1949, Serial No. 92,905

4 Claims. (Cl. 214—38)

This invention relates to a stabilizing jack for truck docks and is particularly directed to a truck dock fixture for adjusting the vertical position of the discharge end of a truck body to the level of the dock platform, so that platform trucks may readily move to and from the truck floor and the platform for the purpose of loading and unloading the truck.

An important object of the invention is to provide a stabilizing device of the character described which has a crossbar engageable under the discharge ends of truck bodies and powered at its ends by independently actuated, elevating devices to thereby move the discharge ends of the truck bodies to the exact plane of the adjacent dock platform.

Another object of the invention is to provide a simplified and rugged device which may be readily installed as a permanent fixture of a truck docking platform and which may be operated by a remotely controlled system for the purposes set out hereinbefore.

Other objects will be apparent from the following specification, it being understood that the drawings show a preferred embodiment of my invention which is clearly defined in the appended claims.

Figure 1:
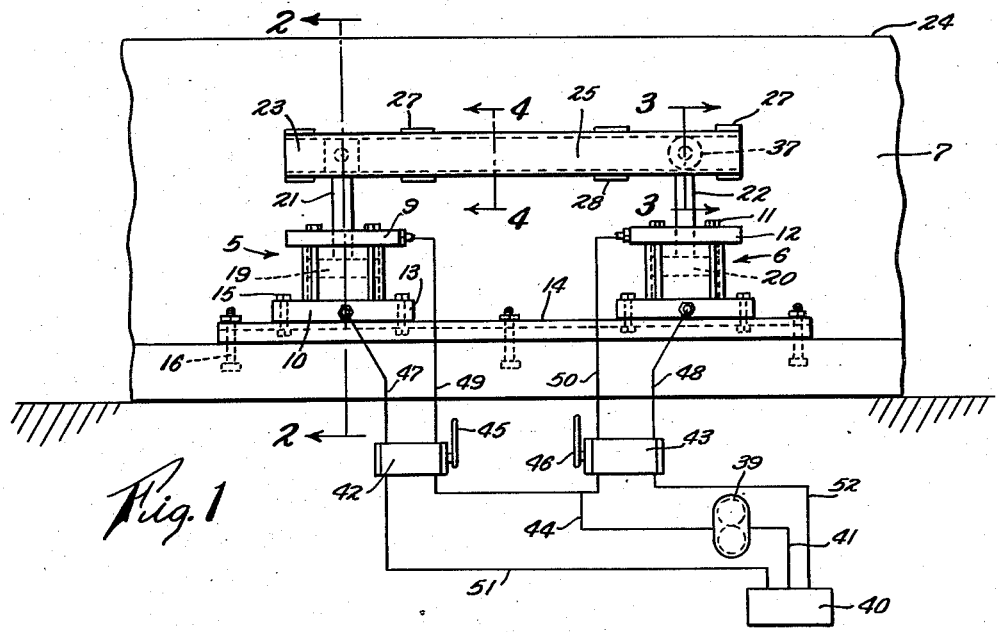
Fig. 1 is a front elevational view of my stabilizing jack in operative position adjacent a truck platform, an hydraulic system for remotely controlling the jack being shown diagrammatically therein.
Figure 2:
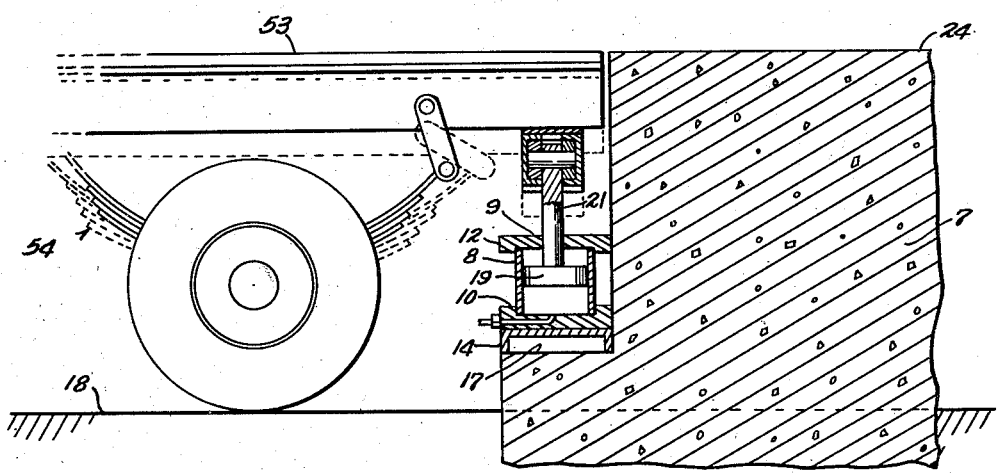
Fig. 2 is a section taken on line 2—2 of Fig. 1, with the discharge end of a truck body shown positioned relative to the dock platform by my jack.

The embodiment of my invention comprises a pair of elevating devices or motors 5 and 6 positioned laterally across the front of a truck dock platform 7. The elevating devices are preferably hydraulically actuated and each of the elevating devices has an hydraulic cylinder 8 closed at its upper and lower ends by a cap plate 9 and a base plate 10 respectively which are held together against the cylinder by a number of tie bolts 11 extending between outwardly projecting flanges 12 and 13 respectively of said plates. The flange 13 of the lower plate for each cylinder is fixed to a channel 14 by suitable bolts 15, said channel in turn being fixed adjacent the front face of the truck dock platform by lag bolts 16 embedded in a forwardly projecting shelf 17 of the dock which preferably is disposed substantially above the level of the ground 18. The cylinder for each of the elevating devices 5 and 6 has a piston type plunger 19 and 20 respectively mounted for vertical reciprocating movement therein, and each has fixed thereto a vertical elevating rod 21 and 22 respectively extending upwardly through the cap plate 9 for said devices.

Figure 3:
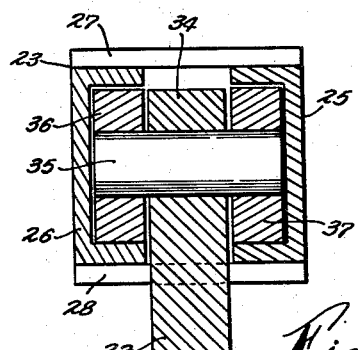
Fig. 3 is an enlarged section taken on line 3—3 of Fig. 1.
Figure 4:
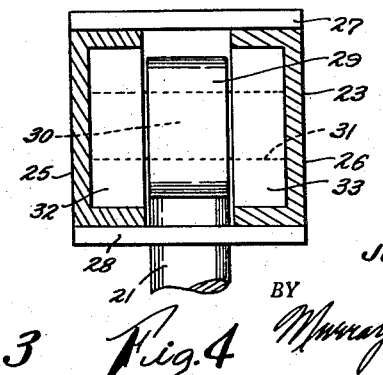
Fig. 4 is an enlarged section taken on line 4—4 of Fig. 1.

A crossbar 23 is mounted upon and between the piston rods 21 and 22 in a position beneath the plane of the platform floor 24. As illustrated in Figs. 3 and 4 this crossbar is constructed from a pair of spaced channels 25 and 26 each positioned on end with their side flanges extending inwardly toward one another. The channels are held together by a series of narrow straps 27 and 28 which extend respectively across the common upper and lower flanges of the channels and are secured thereto by spot welding, or the like.

The piston rod 21 is pivotally connected to one end of the crossbar and for this purpose the upper end of piston rod is developed into a circular head 29 that is provided with a concentric bearing hole 30. The rod extends between the channels and is pivotally connected thereto by a pin 31 which has its intermediate portion extending through the hole 30 in the rod head and is anchored at its ends in blocks 32 and 33 welded or otherwise mounted within the channels 25 and 26 respectively.

The remaining end of the elevating crossbar 23 is supported upon the piston rod 22 for limited lateral displacement and as illustrated in Fig. 3 the upper end of the rod is developed into a head 34 which has a cross shaft 35 fixed therein that carries a pair of rollers 36 and 37 disposed in rolling contact with the inturned flanges of the channels 25 and 26 respectively.

The independent elevating motors are actuated either separately or in unison by a remotely controlled hydraulic system generally indicated by the reference numerals 38 in Fig. 1. A pump 39 takes fluid from a sump tank 40 through line 41 and introduces it under pressure into a pair of hand piloted, 2-way valves 42 and 43, through a split pressure line 44. Depending upon the positions of the manually controlled levers 45 and 46 respectively of the valves 42 and 43, fluid pressure is introduced at a selected rate and time from each of said valves to the lower ends of the motors 5 and 6 through pressure lines 47 and 48 respectively. At the same time that the pressure fluid from lines 47 and 48 are raising the pistons in the cylinders, fluid is being drained from the upper ends of the motors 42 and 43 through lines 49 and 50 respectively which direct said drain fluid to the 2-way valves which are then in position to return said oil to tank through lines 51 and 52. To lower the pistons in their respective cylinders the hand pilots are operated to reverse the pressure and return lines for the motors so that the pressure lines 47 and 48 become drain lines and the drain lines 49 and 50 become pressure lines.

The operation of my stabilizer jack will now be described and it will be noted that a truck 53 is maneuvered so that its discharge end 54 is adjacent the front wall of the platform 7 with the rear ends of its transversely spaced, longitudinal body members 55 disposed above the retracted crossbar 23 of my stabilizing jack. It is contemplated that the platform floor 24 be disposed in a plane slightly higher than the height of the floors for all types of truck bodies when they are in unloaded condition so that my jack must be employed to elevate loaded as well as unloaded trucks to positions where their truck floors are in the plane of the platform floor.

When the discharge end of the truck is above the stabilizing jack the hydraulic system is made operative by manipulating the levers 45 and 46 of the valves 42 and 43 respectively either separately or in unison until the floor of the discharge end of the truck body is raised to the plane of the floor 24 of the dock platform. A platform truck may thereafter move onto or off of the truck body to load or unload the truck and my jack will maintain the truck body in fixed, adjusted position with respect to the platform until the loading or unloading process is completed whereupon the hand operated pilot levers of the valves 42 and 43 are moved to reverse the pressure and drain lines to said valves to actuate the cylinders and lower the crossbar to inoperative position.

Truck bodies are generally laterally inclined because of the disposition of the load, relative condition of the chassis spring suspension or the unevenness of the roadway. It will be noted that my stabilizing jack has an elevating cross bar which may be raised by laterally disposed elevating devices that are independently actuated so that the ends of the bar may be moved upwardly unequal distances to compensate for the lateral inclination of the truck bodies and raise said bodies to the proper plane with respect to the floor of the dock platform. My jack also provides a means for relieving the discharge end of the body and the rear spring suspension of the chassis from undue strain when a platform truck and its load is supported thereby during delivery or removal of said load from the truck.

What is claimed is:

1. In a device of the character described the combination of a stationary platform, a truck chassis engaging crossbar disposed across the front of the platform and substantially beneath the level of the floor therefor, a vertically effective motor mounted beneath each end of the crossbar, elevator rods for each motor, means for pivotally connecting a motor rod to one end of the crossbar, means for mounting the opposed end upon the remaining motor rod for rolling engagement therewith, and remote, independent means for controlling the power transmitted from each of the motors to the respective ends of the crossbar.

2. In a device of the character described the combination of a stationary platform, a truck chassis engaging crossbar disposed across the front of the platform and beneath the level of the floor therefor, a hydraulic motor mounted beneath each end of the crossbar, a piston rod extending upwardly from each motor, means for pivotally connecting a piston rod to one end of the crossbar, rollers carried by the remaining piston rod and in rolling engagement with the opposed end of the crossbar, a source of power for the motors, and remote, independent control means for optionally supplying fluid pressure to either end of each motor from the power source and returning fluid from the other end to said source.

3. In a device of the character described the combination of a stationary platform, a truck chassis engaging crossbar disposed across the front of the platform and beneath the level of the floor therefor, said crossbar comprising a pair of spaced channel members disposed on their sides and having their common flanges extending inwardly, and straps for securing the channels together, a hydraulic motor mounted beneath each end of the crossbar, a piston rod extending upwardly from each motor, a pair of blocks secured in a common end of each channel, a connecting pin anchored at its ends in the blocks and having its intermediate portion passing through an aligned bearing hole formed in one piston rod, a pair of rollers mounted on opposite sides of the upper end of the remaining piston rod and each disposed in a channel for rolling engagement therewith, a source of power for the motors, and independent control means for connecting the source of power with each end of the motors.

4. In a device of the character described the combination of a stationary platform, a truck chassis engaging crossbar disposed across the front of the platform and beneath the level of the floor therefor, said crossbar comprising a pair of spaced channel members disposed on their sides and having their common flanges extending inwardly, and straps for securing the channels together, a hydraulic cylinder mounted beneath each end of the crossbar, a piston rod extending upwardly from each cylinder, a pair of blocks secured in a common end of each channel, a connecting pin anchored at its ends in the blocks and having its intermediate portion passing through an aligned bearing hole formed in one piston rod, a pair of rollers mounted on opposite sides of the upper end of the remaining piston rod and each disposed in a channel for rolling engagement therewith, a source of power for the cylinders, and independent control means for connecting the source of power with each end of the cylinders for reciprocating the pistons in the cylinders.

JOSEPH J. FRENCH.

REFERENCES CITED

The following references are of record in the file of this patent:

UNITED STATES PATENTS

| Number | Name | Date |
|---|---|---|
| 932,811 | Ruegg | Aug. 31, 1909 |
| 1,354,688 | Rice | Oct. 5, 1920 |
| 1,470,581 | Duffy | Oct. 9, 1923 |
| 2,168,061 | Christie et al. | Aug. 1, 1939 |